United States Patent [19]
DeBonte

[11] Patent Number: 4,607,266
[45] Date of Patent: Aug. 19, 1986

[54] PHASE CHANGE INK JET WITH INDEPENDENT HEATING OF JET AND RESERVOIR

[76] Inventor: William J. DeBonte, 271 Marrett Rd., Lexington, Mass. 02173

[21] Appl. No.: 661,029

[22] Filed: Oct. 15, 1984

[51] Int. Cl.[4] .............................................. G01D 15/16
[52] U.S. Cl. .............................................. 346/140 PR
[58] Field of Search ............. 346/1.1, 140 PD, 140 R; 400/126; 106/20, 30, 31

[56] References Cited

U.S. PATENT DOCUMENTS 4,490,731 12/1984 Vaught .............................. 346/140 R

FOREIGN PATENT DOCUMENTS 0097823 1/1984 European Pat. Off. .

*Primary Examiner*—E. A. Goldberg
*Assistant Examiner*—Mark Reinhart

[57] ABSTRACT

An ink jet apparatus employing hot melt ink includes a reservoir which may be heated independently of the ink jet itself. This permits the reservoir to be heated when the apparatus is to operate in the ejection mode, so as to melt the ink into the liquid state in the reservoir. The reservoir may also be cooled so as to return the ink in the reservoir to the solid state in the stand-by mode while the ink in the jet remains in the liquid state at all times throughout the stand-by mode and the ejection mode.

21 Claims, 4 Drawing Figures

PHASE CHANGE INK JET WITH INDEPENDENT HEATING OF JET AND RESERVOIR

BACKGROUND OF THE INVENTION

This invention relates to an ink jet wherein the ink within the jet is of the phase change type which may be referred to as hot melt ink.

The phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984. The hot melt ink may be jetted from a variety of apparatus including those disclosed in the aforesaid copending application.

It has been found that extended or continuous heating of hot melt ink to a temperature such that the ink is in a liquid state can actually degrade the ink. In other words, the application of heat at an elevated temperature will adversely affect the characteristics of the ink such that both the performance of the ink jet as well as the characteristics of the jetted ink will vary. Such a degradation can adversely affect quality of printing achieved by an ink jet or an array of ink jets.

Because of this degradation of the ink, it has been found to be desirable to cool the ink when the ink jet is in a standby mode, i.e., the ink jet is not being called upon to print. However, hot melt ink will contract upon a phase change from the solid state to the liquid state. Such a contraction can result in the depriming of the ink jet which is, of course, undesirable.

SUMMARY OF THE INVENTION

It is an object of this invention to provide a hot melt ink jet method and apparatus wherein degradation of the ink due to extended heating is minimized.

It is a further object of this invention to provide a hot melt ink jet method and apparatus wherein the depriming of the ink jet is minimized.

In accordance with these and other objects of the invention, a preferred embodiment of the invention comprises an ink jet apparatus employing phase change ink wherein the apparatus includes imaging means comprising an ink jet chamber, an orifice and an inlet to the chamber. The apparatus further comprises an ink reservoir for storing ink.

In accordance with this invention, the ink in the reservoir is maintained in the solid state when the ink jet apparatus is in a standby mode. The ink in the imaging means is maintained in a liquid state during the standby mode. The ink in the reservoir is then heated so as to melt into a liquid state in the reservoir and maintained in the liquid state in both the imaging means and the reservoir during a droplet ejection mode.

In accordance with one aspect of the invention, the ink in the liquid state in the imaging means is heated so as to elevate the temperature of the ink in the droplet ejection mode over the temperature of the ink in the standby mode.

In accordance with another aspect of the invention, the temperature of the ink in the imaging means in the droplet ejection mode is greater than the temperature of the ink in the reservoir in the droplet ejection mode.

In accordance with another aspect of the invention, the temperature of the ink is maintained substantially constant in the reservoir during the standby mode, substantially constant in the imaging means during the standby mode, substantially constant in the reservoir during the droplet ejection mode and substantially constant in the imaging means during the droplet ejection mode.

In accordance with another aspect of the invention, a portion of the ink in the reservoir adjacent the inlet to the ink jet chamber is maintained in the liquid state in the standby mode.

In order to accomplish the foregoing, the apparatus comprises means for substantially independently heating the imaging means and the reservoir means so as to permit the ink to be maintained in the liquid state in the imaging means while permitting the ink to change from a liquid state to a solid state and vice versa in the reservoir means.

In further accordance with this invention, the means for substantially independently heating the imaging means and the reservoir includes a first heater closely thermally coupled to the imaging means and a second heater closely thermally coupled to the reservoir means. A high thermal resistance path or barrier may be used between the imaging means and the reservoir means so as to permit independent heating.

In order to maintain the ink at the inlet in a liquid state in a standby mode, the inlet may comprise a substantially thermally conductive material.

Preferably, the imaging means as well as the reservoir means comprises a thermally conductive material having a thermal conductivity in excess of 0.03 g cal/sec $cm^2$(°C./cm) and preferably in excess of 0.2 g cal/sec $cm^2$(°C./cm).

DETAILED DESCRIPTION OF A PREFERRED EMBODIMENT

Figure 1:
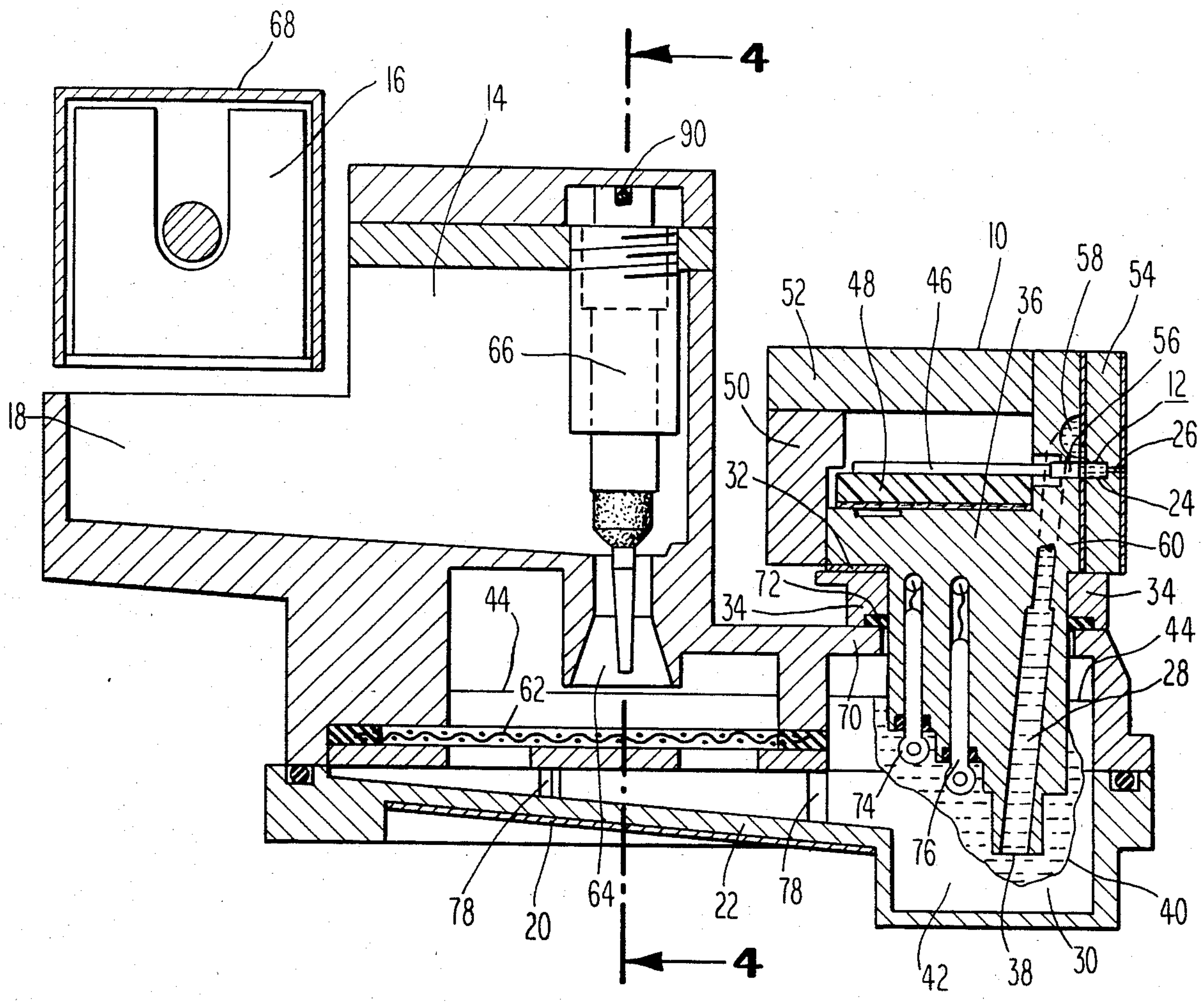
FIG. 1 is a sectional view of an ink jet apparatus in the embodiment of this invention.

Referring to FIG. 1, an ink jet apparatus comprises an imaging head 10 including at least one ink jet 12 and a reservoir 14. In accordance with this invention, the ink jet apparatus is adapted to jet hot melt or phase change ink. As shown, a block of solid state ink 16 is juxtaposed to an opening in a trough 18. When the pellet 16 drops into the the trough 18, the pellet 16 proceeds to melt in response to heat generated by a heater 20 located at the base of the reservoir 14 below a sloping surface 22.

As shown in FIG. 1, the ink jet 12 includes a chamber 24 having an orifice 26 for ejecting droplets of ink and an inlet 28 extending toward the lowermost extremity 30 of the reservoir 14 adjacent the sloping bottom 22.

In accordance with this invention, the head 10 is provided with an independent heater 32 located between a thermal resistance barrier 34 and a head member 36. By providing the heater 32 which is independent of the heater 20, it is possible to maintain the head 10 at a different temperature from the reservoir 14. This allows the reservoir 14 and the ink within the reservoir to be cooled in the standby mode, thereby avoiding cooking of and resulting degradation of a large volume of ink while at the same time maintaining the ink within the imaging head 10 in a liquid state so as to prevent depriming.

With respect to the prevention of depriming, it will be appreciated that inlet 28 passes through the head member 36 which is highly conductive such that heat is conducted to the end 38 which maintains a pool of ink 40 in the liquid state in the immediate vicinity of the end 38 while the remainder of the ink within the reservoir 14 is able to cool to the solid state when the system is in a standby mode. As shown in FIG. 1, the pool 40 of liquid ink is maintained in an otherwise solid state mass 42 of ink extending up to a level 44.

As also shown in FIG. 1, a transducer 46 is juxtaposed to the end of the chamber 24. The transducer which is provided with electrodes is energized by a signal provided through a printed circuit board 48 located above the member 36. The transducer 46 and the printed circuit board 48 are then housed within head members 50 and 52.

As also shown in FIG. 1, the head includes a chamber plate 54 forming the chamber 24, which is in communication with a foot 56 located at the end of the transducer 46. As the transducer changes state in response to signals applied, the position of the foot 56 varies so as to expand and compress the volume within the chamber 24. The inlet 28 supplies a manifold 58 located in a plate 60 which is coupled to restricted inlets to the jet 12. Actually, the manifold 58 serves a plurality of restricted inlets in an array of ink jets identical to the jet 12 shown in FIG. 1. Further details concerning the nature of the ink jet 12 and other jets in the array including the configuration of the manifold 28 are disclosed in copending application Ser. No. 661,794, filed Oct. 17, 1984, which is assigned to the assignee of this invention and incorporated herein by reference.

The reservoir 14 as shown in FIG. 1 also includes a filter 62 which is located below a port 64 which is adapted to be opened and closed by a needle valve 66. The needle valve 66 is employed to close the port 64 during the priming as disclosed in copending application Ser. No. 661,925, filed Oct. 17, 1984, which is incorporated herein by reference. Ink is delivered to the reservoir 14 by means of a cartridge 68 as disclosed in copending application Ser. No. 661,922, filed Oct. 17, 1984, which is assigned to the assignee of this invention and incorporated herein by reference.

As also shown in FIG. 1, the insulating barrier 34 which provides a high thermal resistance path is sealed against portion 70 of the reservoir 14, using an O-ring 72 which is also characterized by adequate insulating properties. Preferably, the member 36 which extends down into the reservoir 14 toward the lowermost portion 30 is slightly spaced from portion 70 of the reservoir 14. This spacing assures an adequate thermal barrier and high thermal resistance path so as to permit independent heating of the ink within the head as compared to the heat within the reservoir 14.

Finally, FIG. 1 shows low and out-of-ink level sensing elements 74 and 76, which may comprise thermistors, RF level sensing or other electrical sensor means. Baffles with slots 78 are also provided in the reservoir 14 as disclosed in copending application Ser. No. 661,925, filed Oct. 17, 1984, which is assigned to the asignee of this invention and incorporated herein by reference.

From the foregoing, it will be appreciated that the ink within the reservoir 14 may be maintained in a solid state during the standby mode while the ink within the head 10 is maintained in the liquid state. However, when it is desirable to operate in a droplet ejection mode, the temperature of the ink within the reservoir 14 may be elevated so as to undergo a phase change from a solid state to a liquid state. Of course the ink within the head 10 remains in the liquid state where it is even elevated further in the droplet ejection mode.

Figure 4:
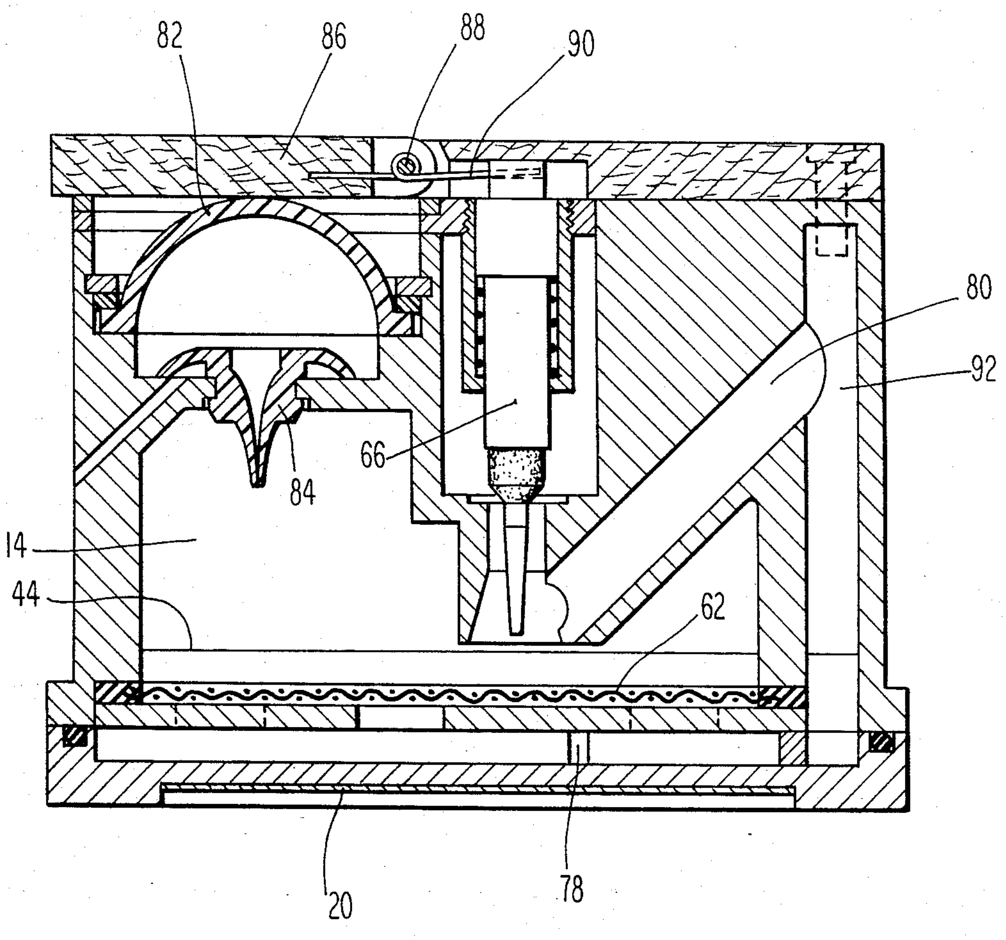
FIG. 4 is a sectional view taken along line 4—4 of FIG. 1.

Referring to FIG. 4, a by-pass between the valve 66 and the filter 62 is shown. The by-pass comprises a stand-pipe 92 and a channel 80. This by-pass is necessary since the filter 62 may not permit the passage of air. In addition, FIG. 4 discloses a means by which the ink jets may be primed in the even of depriming. This may be accomplished by means of a bulb 82 which communicates with a one-way valve 84 in the upper region of the reservoir 14. When a door 86 covering the bulb 82 is opened, the door 86 pivots about a point 88. The opening of the door 86 exposes the bulb 82 with the valve 66 closed so as to permit a forcing of air into the reservoir 14 through the one-way valve 84 until such time the ink jet is properly primed.

In order to achieve this independent heating of the ink within the reservoir 14 and the ink within the head 10, it is necessary to assure adequate conductivity to heat the ink, as disclosed in copending U.S. application Ser. No. 661,924, filed Oct. 17, 1984, which is assigned to the assignee of this invention and incorporated herein by reference. Therefore, substantially all portions of the reservoir 14 and associated parts in contact with the ink (directly or indirectly through a nonreactive coating) preferably have a thermal conductivity factor in excess of 0.03 g cal/sec cm$^2$(°C./cm) and preferably in excess of 0.2 g cal/sec cm$^2$(°C./cm). The same is true with respect to the head 10. Suitable materials include stainless steel and aluminum. On the other hand, it is desirable to provide a thermal insulating factor or thermal resistance so as to permit the independent heating of the reservoir 14 as compared with the head 10. Of course, the inlet 28 to the head 10 is of a thermal conductivity of 0.03 g cal/sec cm$^2$(°C./cm) preferably in excess of 0.2 g cal/sec cm$^2$(°C./cm) as is the remainder of the head so as to achieve an always liquid state of the pool 40 even in the standby mode, thereby preventing depriming.

Figure 2:
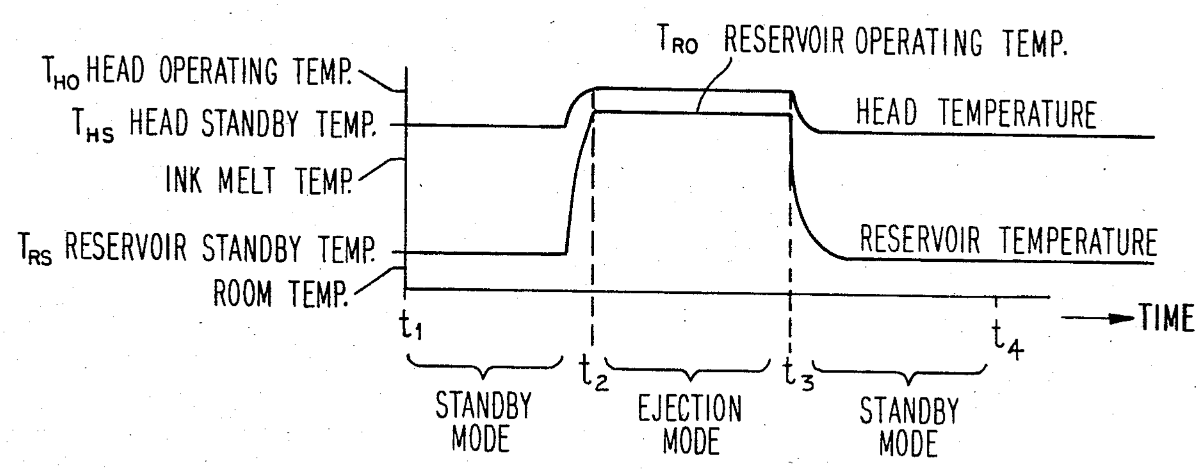
FIG. 2 is a schematic representation of the temperature of the imaging means or head and the reservoir as a function of time.

Referring to FIG. 2, the relative temperature of the imaging head 10 and the reservoir 14 are depicted with temperature on the vertical axis and time on the horizontal axis. As shown, the head standby temperature while the head is in the standby mode between times $T_1$ and $T_2$ is above the ink melting temperature but rises even higher to a head operating temperature during the droplet ejection mode between times $T_2$ and $T_3$. Then, when the ink jet apparatus returns to the standby mode between times $T_3$ and $T_4$, the head temperature drops back down to the head standby temperature. In contrast, the reservoir standby temperature between times $T_1$ and $T_2$ and times $T_3$ and $T_4$ is below the melting point. However, at time $T_2$, the reservoir temperature is raised, in this particular embodiment, up to substantially the same level as the head standby temperature, i.e., above the ink melt temperature.

It will be noted that the temperature of the ink in both the reservoir and the head is substantially constant during the ejection mode so as to provide uniformity. Of course, by maintaining the head standby temperature and the head operating temperature above the melting point at all times, depriming of the head is avoided. On the other hand, by allowing the reservoir to cool to a temperature just above room temperature and well below the ink melting point during the standby mode, extended cooking and degradation of the supply of ink is avoided.

Figure 3:
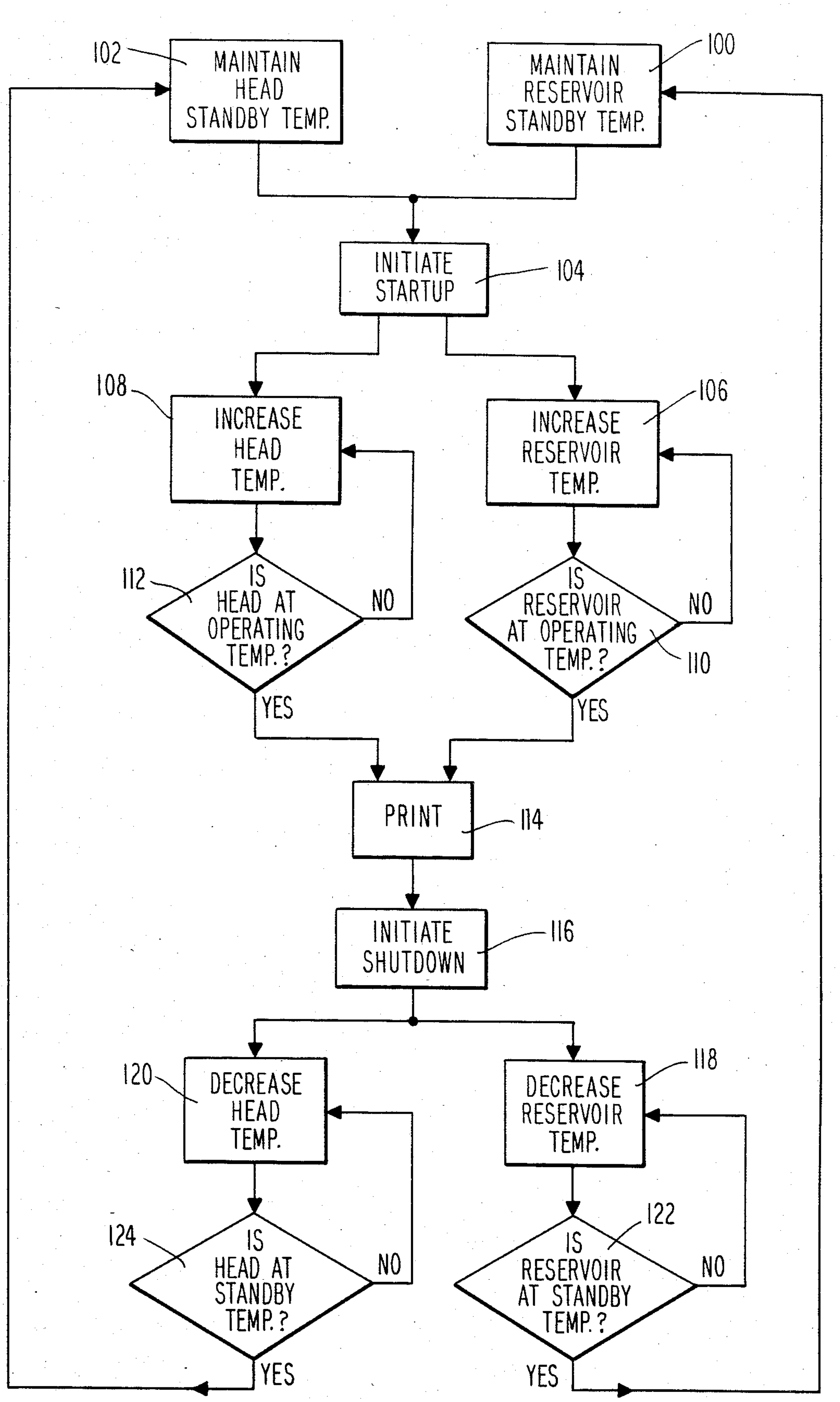
FIG. 3 is a flow diagram depicting the operation of the system of FIG. 1 to achieve the temperatures as a function of time as depicted in FIG. 2.

Control of the imaging apparatus of FIG. 1 to achieve the relative temperature shown in FIG. 2 will now be described with reference to the flow diagram of FIG. 3. As shown, the reservoir 14 is maintained at a first temperature below the melting point of the ink in the standby mode as depicted by block 100. At the same time, the head is maintained at a second standby temperature above the melting point of ink as depicted by block 102. Just prior to time $T_2$ as shown in FIG. 3, start-up is initiated as depicted by block 104 of FIG. 3, which begins the elevation of the temperature of the ink in the head as well as the reservoir as depicted by blocks 106 and 108. The temperature of the reservoir and the head is monitored as depicted by blocks 110 and 112.

When the temperature in the reservoir reaches a third temperature which is substantially equal to the head standby temperature and the temperature of the ink in the head reaches a fourth temperature representing the head operating temperature, droplet ejection for printing may proceed as depicted by block 114. After droplet ejection and printing has been completed, shut-down may be initiated as depicted by block 116 whereupon the temperature of the ink in the reservoir as well as the temperature of the ink in the head is decreased as depicted by blocks 118 and 120. The temperature of the ink in both the reservoir and the head is then monitored as depicted by blocks 122 and 124 until such time as the reservoir and the head reach the standby temperature whereupon these temperatures are maintained as depicted by blocks 100 and 102.

The preferred embodiment of the invention may utilize ink as disclosed in U.S. Pat. No. 4,390,369 and pending U.S. applications Ser. No. 610,627, filed May 16, 1984, Ser. No. 565,124, filed Dec. 23, 1983 and Ser. No. 644,542, filed Aug. 27, 1984, all of which are assigned to the assignee of this invention and incorporated herein by reference.

Reference is made throughout the specification and the appended claims to temperatures of the ink at a particular location, e.g., within the reservoir. It will be appreciated that slight gradient will exist within the ink and its surroundings, e.g., the walls of the reservoir. However, these gradients are substantially minimized and the vast majority of ink at a particular location is at substantially the same temperature.

Although a particular embodiment of the invention has been shown and described, it will be understood that other embodiments and modifications will occur to those of ordinary skill in the art which will fall within the true spirit and scope of the appended claims.

I claim:

1. Ink jet apparatus comprising:

imaging means comprising at least one ink jet including a chamber, an orifice for ejecting droplets from a chamber and an inlet to the chamber;

ink reservoir means for storing hot melt ink, said ink characterized by a solid state below a predetermined temperature and a liquid state above said temperature;

means for substantially independently heating said imaging means and said reservoir means so as to permit said ink to be maintained in the liquid state in said imaging means while permitting said ink to change from the liquid state to the solid state and vice versa in said reservoir means; and means for controlling said means for substantially independently heating so as to continuously maintain the ink in the liquid state in the imaging means while alternately cooling the ink in the reservoir to the solid state or heating ink to the liquid state.

2. The apparatus of claim 1 wherein said means for substantially independently heating includes a first heater closely thermally coupled to said imaging means and a second heater closely thermally coupled to said reservoir means.

3. The apparatus of claim 2 wherein said means for substantially independently heating said imaging means and said ink reservoir means comprises thermal resistance means between said imaging means and said reservoir means.

4. The apparatus of claim 1 wherein said inlet extends into said reservoir, said inlet comprising a substantially thermally conductive material so as to maintain the ink in said reservoir adjacent said inlet in the liquid state.

5. The apparatus of claim 4 wherein substantially all of said imaging means in contact with said ink has a thermal conductivity in excess of 0.03 g cal/sec $cm^2$(°C./cm).

6. The apparatus of claim 4 wherein substantially all of said imaging means in contact with said ink has a thermal conductivity in excess of 0.2 g cal/sec $cm^2$(°C./cm).

7. The apparatus of claim 6 wherein substantially all of said reservoir means in contact with said ink has a thermal conductivity in excess of 0.03 g cal/sec $cm^2$(°C./cm).

8. The apparatus of claim 4 wherein substantially all of said reservoir means in contact with said ink has a thermal conductivity in excess of 0.2 g cal/sec $cm^2$(°C./cm).

9. The apparatus of claim 4 wherein substantially all of said reservoir means in contact with said ink has a thermal conductivity in excess of 0.03 g cal/sec $cm^2$(°C./cm).

10. A method of operating an ink jet apparatus employing phase change ink, said apparatus comprising imaging means including a chamber, an orifice and an inlet to the chamber and an ink reservoir for storing ink, said method comprising the following steps:

maintaining the ink in the reservoir at a first temperature when the apparatus is in a standby mode;

maintaining the ink in the imaging means at a second temperature in excess of the first temperature when the apparatus is in a standby mode and an ejection mode;

heating the ink in the reservoir so as to raise the ink in the reservoir to a third temperature;

ejecting droplets of ink while the ink in the reservoir is at said third temperature; and cooling the ink in the reservoir so as to lower the ink in the reservoir to said first temperature when the apparatus is returned to the standby mode.

11. The method of claim 10 including the following steps:

heating the ink in the imaging means to a fourth temperature in excess of said third temperature; and ejecting droplets of ink while the ink in the head is at said fourth temperature.

12. The method of claim 11 wherein the fourth temperature is in excess of said third temperature.

13. The method of claim 12 wherein said first temperature is below the melting point of the ink, said second temperature is above the melting point of the ink, said third temperature is above the melting point of the ink, and said fourth temperature is above the melting point of the ink.

14. The method of claim 13 wherein the second temperature is substantially equal to the fourth temperature.

15. The method of claim 10 wherein said second temperature and said third temperature are above the melting point of the ink.

16. A method of operating an ink jet apparatus employing phase change ink, said apparatus comprising imaging means including a chamber, an orifice and an inlet to the chamber, an ink reservoir for storing ink, said method comprising the following steps:

maintaining the ink in the reservoir in the solid state in a standby mode;

maintaining the ink in the imaging means in the liquid state during the standby mode;

heating the ink in the reservoir so as to melt the ink into a liquid state in the reservoir;

maintaining the ink in the imaging means and the reservoir means in the liquid state during the droplet ejection mode; and cooling the ink in the reservoir after droplet ejection to return the ink in the reservoir to the solid state in the standby mode.

17. The method of claim 16 including the step of heating the ink in the liquid state in the imaging means so as to elevate the temperature of the ink in the droplet ejection mode over the temperature of the ink in the standby mode.

18. The method of claim 17 wherein the temperature of the ink in the imaging means in the droplet ejection mode is greater than the temperature of the ink in the reservoir in the droplet ejection mode.

19. The method of claim 16 wherein the temperature of the ink in the reservoir in the standby mode is above room temperature.

20. The method of claim 16 wherein the temperature of the ink is maintained substantially constant in the reservoir during the standby mode, substantially constant in the imaging means during the standby mode, substantially constant in the reservoir during the droplet ejection mode, and substantially constant in the imaging means in the droplet ejection mode.

21. The method of claim 16 including the step of maintaining a portion of the ink in the reservoir adjacent the inlet in the liquid state in the standby mode.

* * * * *